Dec. 15, 1931.                 F. SCHUBERT                    1,836,621
        METHOD OF AND ARRANGEMENT FOR EXAMINING THE LOCAL
         STRENGTH OF FABRICS, PAPER, RUBBER, AND THE LIKE
                      Filed Nov. 19, 1928
Fig.1
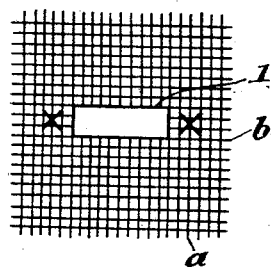
Fig.2    Fig.3    Fig.4
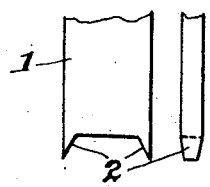 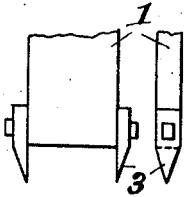 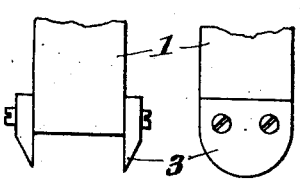
Fig.5    Fig.6
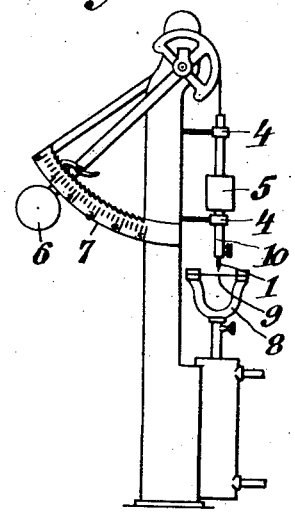 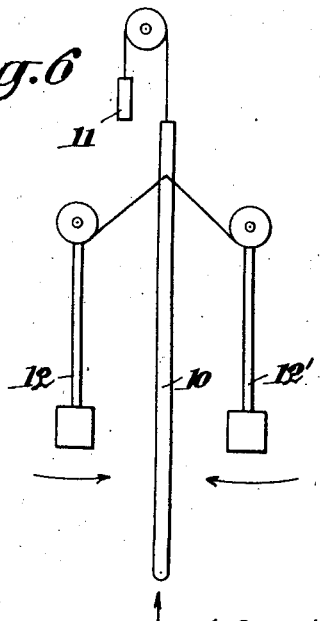
F. Schubert
INVENTOR
By Marks & Clark
ATTYS.

Patented Dec. 15, 1931

1,836,621

UNITED STATES PATENT OFFICE

FRIEDRICH SCHUBERT, OF VIENNA, AUSTRIA

METHOD OF AND ARRANGEMENT FOR EXAMINING THE LOCAL STRENGTH OF FABRICS, PAPER, RUBBER, AND THE LIKE

Application filed November 19, 1928, Serial No. 320,433, and in Austria November 24, 1927.

This invention relates to a method of and arrangement for examining the local strength of fabrics, paper, rubber and the like, which is not only fully equivalent to the known mode of testing which is the only satisfactory mode, namely the tearing test, but is far superior to the same in that the testing time is considerably reduced, while the accuracy of testing is essentially increased.

A further advantage of the present invention consists in the separate utilization of warp and weft according to local strength. Compared with the known tearing test and holing test, the warp-threads and weft-threads are held in tension simultaneously according to the present invention, while the difference between the present process and the known paper-tests resides in that the strength of the main directions of the piece to be tested (thus for instance the warp of the fabric or the machine-direction of the paper) can be determined separately.

The process according to the present invention consists in holing or cutting the material to be tested, held in tension in all directions, in the main testing direction at both sides of and close to the sides of a pressure tool, and subsequently allowing the said tool to operate on the severed piece secured against sliding off.

A pressure tool of rectangular cross-section is employed for carrying the present process, the said tool being provided with cutting edges or the like extending beyond the end of the tool and corresponding in width to the size of the pressure tool.

Some modes of carrying out the present invention is illustrated by way of example on the accompanying sheet of drawings, in which:—

Fig. 1 illustrates diagrammatically the mode of carrying out the process.

Figs. 2, 3 and 4 are front views and side views of differently shaped stamping tools, while Figs. 5 and 6 are diagrammatic views of testing machines.

In the diagram shown in Fig. 1, a designates the warp-threads and b the weft-threads of a testing material fixed in any convenient manner. The weft-threads are cut through at both sides of the pressure stamp or tool 1 (designated by x) close to the latter, this being carried out exactly in accordance to the extent of the tool in the main testing direction of the testing material.

If the pressure tool 1 is operated it co-operates solely with the warp-threads over an area corresponding exactly to the area of the tool, whereby the tension and connection of the fabric is fully maintained. Thus a local testing of the strength is carried out according to requirement, e. g. either of the warp or of the weft.

As shown in Fig. 2, the bolt 1 is provided with lateral extensions 2 while in the embodiment shown in Fig. 3 separate members 3 are secured to the bolt 1. As illustrated in Fig. 4 by way of example, the bolt can be of any size in the main-testing direction, thus need not be made in the form of a narrow bolt. However it is necessary, that the laterally projecting parts correspond in the main-testing direction as exactly as possible to the corresponding size of the bolt. The actual pressure-face of the bolt may be of any convenient shape. The pressure-face of the bolt is, preferably, roughened or provided with serrations or the like in order to positively prevent a sliding off of the originally bounded thread-parts.

Any known apparatus can be used for carrying out the process, such as testing devices for fabrics or paper as well as piercing testers.

Pendulum dynamometers adapted for testing the tensile strength have been found very useful.

Constructions thereof are diagrammatically illustrated in Figs. 5 and 6. Fig. 5 shows a device for testing the tensile strength adapted for use in connection with the present invention. The pressure-bolt holder 10, guided in vertical guides 4, is suspended from the chain of the upper test-piece clamp of the device for testing the tensile strength. By means of an adjustable weight 5, the bolt 1 inserted in the holder 10 can be brought into such a position, that in the initial position the pendulum can oscillate satisfactorily.

According to the changed conditions the scale 7 and the arresting device operate in the reversed manner. A clamping device 8 of known construction, in which the material 9 to be tested is fixed, is mounted in place of the bottom test-piece clamp. The material to be tested is pressed against the bolt 1, thus lifting the latter and its holder 10 until the material is torn. The pendulum automatically secured in the corresponding position indicates the strength of the material.

Fig. 6 shows a modified construction in which the bolt-holder 10 is relieved by a weight 11 and is loaded by two oppositely moving pendulums 12 and 12', crossing one another in different planes.

In this case, the holder is subjected to pressure from the bottom and only one pendulum has to be provided with the scale and arresting device.

I claim:—

1. Method of examining the local strength of fabrics, paper, rubber and the like which consists in holding the material to be tested in tension in all directions, cutting the said material in the main testing direction at both sides of and close to the sides of a pressure tool, and subsequently allowing the latter to operate on the severed piece secured against sliding off.

2. Arrangement for examining the local strength of fabrics, paper, rubber and the like comprising a pendulum dynamometer, a vertically movable bolt-holder secured to the same, a scale and an arresting device provided on the said dynamometer.

3. Method of examining the local strength of fabrics, paper, rubber and the like which consists in holding the specimen to be tested in tension in all directions, perforating the specimen parallel to the direction to be tested on either side of the position of subsequent load to an extent which is not larger than the width of the part of the said specimen, and subsequently loading the latter by a rectangular pressure tool guided perpendicularly to the stretched surface of the specimen with the side surfaces of the tool parallel to the direction of tension.

4. In a pendulum dynamometer for examining the local strength of fabrics, paper, rubber and the like, the combination of a test-tool, means connecting the tool and dynamometer, and pressure means forcing said tool onto the specimen to be tested.

5. Arrangement as claimed in claim 4, further comprising two pendulum scales operating the bolt-holder.

6. Arrangement as claimed in claim 4 further comprising two pendulum scales, means connecting the bolt-holder with the latter, and a counter-weight passing over a pulley attached to the bolt holder.

In testimony whereof I affix my signature.

Dr. FRIEDRICH SCHUBERT.